Sept. 29, 1964  A. J. NUNES CORREIA RALHA  3,151,125
PROCESS TO OBTAIN VISNAGAN BY EXTRACTION
OF AMMI VISNAGA L. (LAM.)
Filed Aug. 7, 1961  2 Sheets-Sheet 1
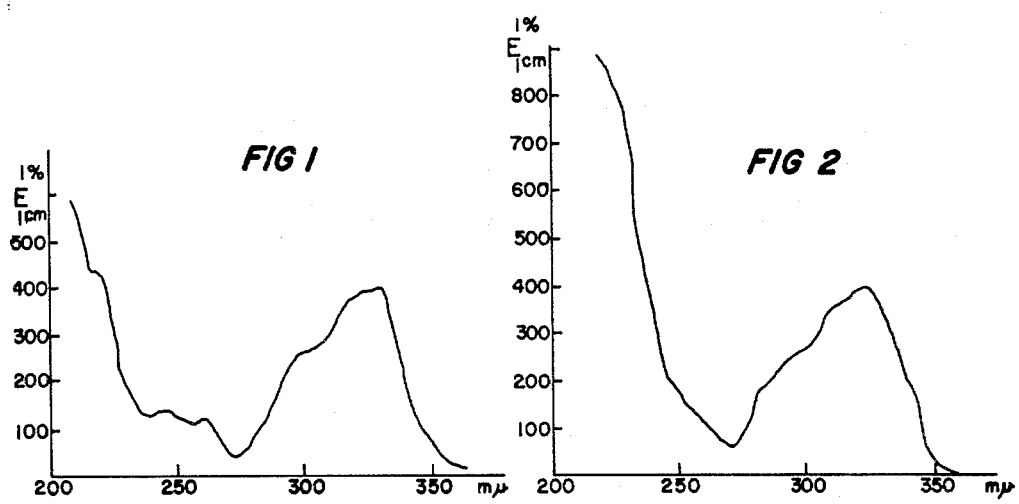
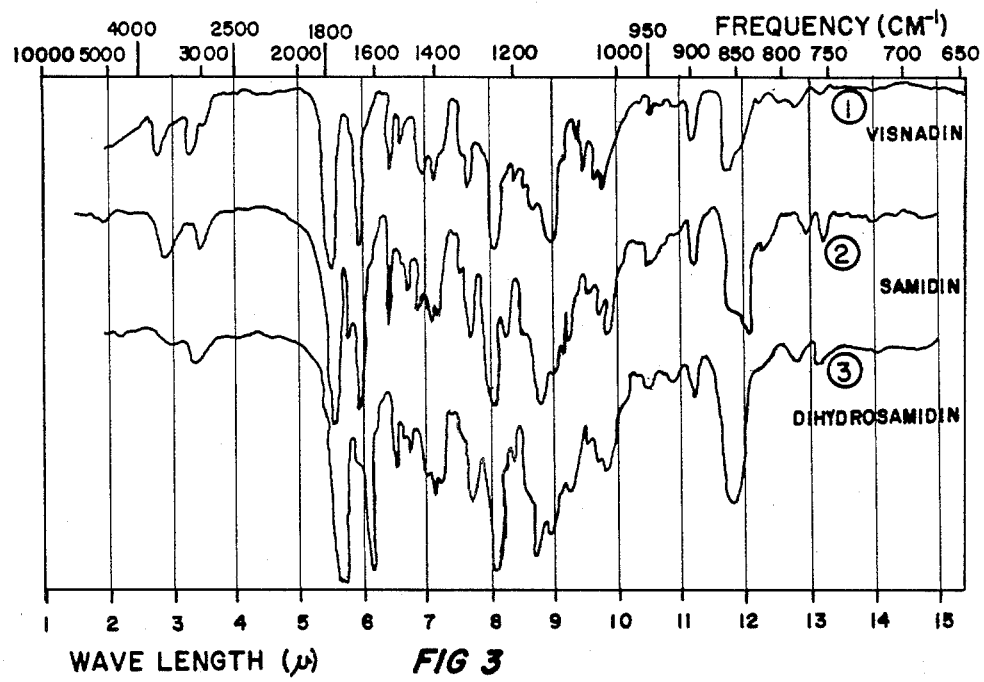
INVENTOR,
Alberto José Nunes Correia Ralha
ATTORNEYS

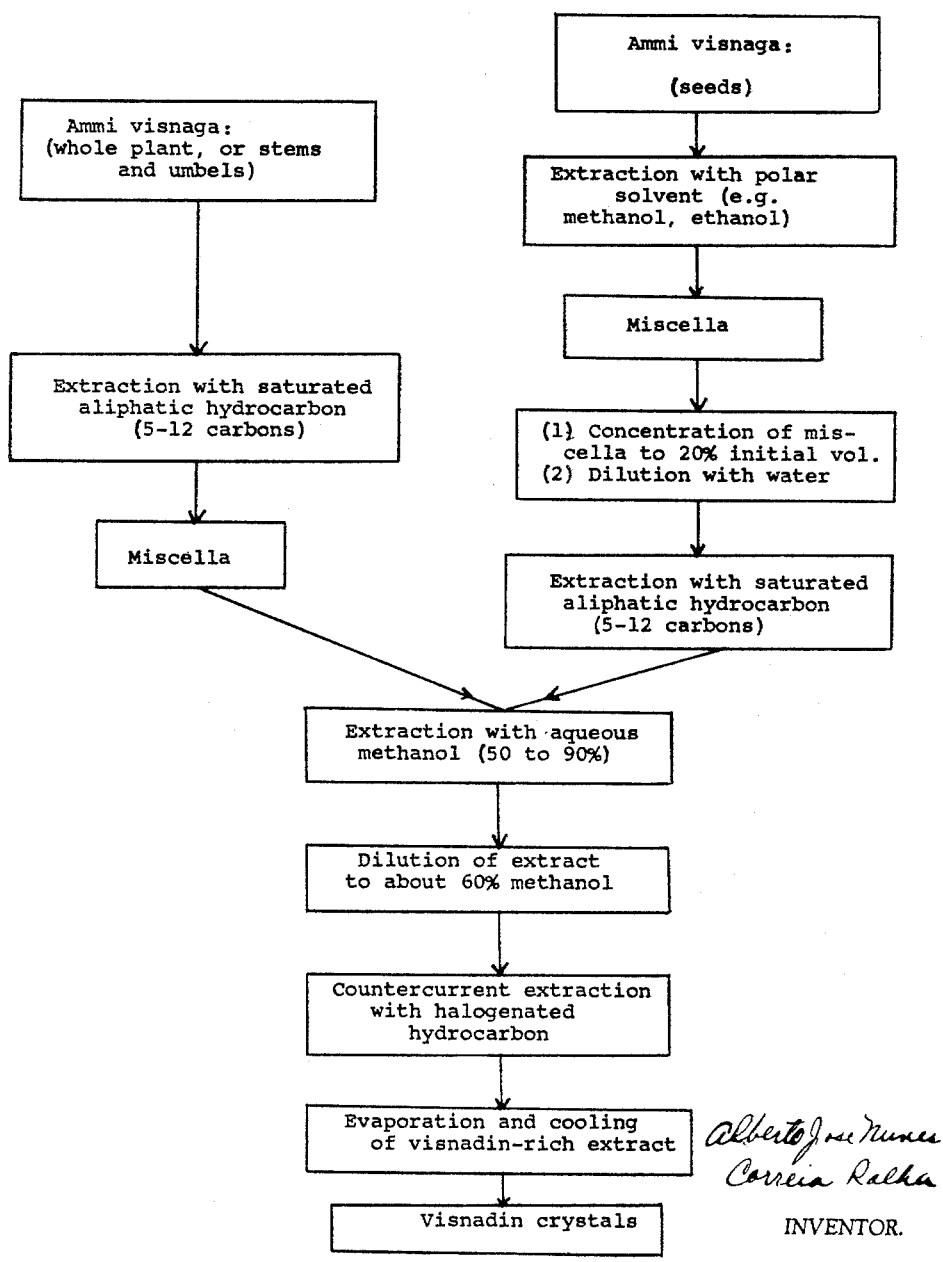

3,151,125
**PROCESS TO OBTAIN VISNAGAN BY EXTRACTION OF *AMMI VISNAGA* L. (LAM.)**
Alberto José Nunes Correia Ralha, Lisbon, Portugal, assignor to Pires & Mourato Vermelho, Lda., Lima, Lisbon, Portugal
Filed Aug. 7, 1961, Ser. No. 129,908
Claims priority, application Portugal, Aug. 5, 1960, 37,468
9 Claims. (Cl. 260—343.2)

This invention relates to a process for the production of a visnagan rich in visnadin from *Ammi visnaga* L. (Lam.), also called "bishop's-weed," an umbellifera which is found in the coastal regions of the Mediterranean. This plant will be referred to hereinafter as "bishop's-weed."

It is an object of this invention to provide a process for extracting visnagan from bishop's weed on an industrial scale.

Visnagan is chemically a mixture of three coumaringlycoldiesters [W. Bencze, O. Halper and H. Schmid, "Experientia," 12, 137 (1956); A. C. Ralha and A. P. Teixeira, Rev. Portuguesa Quim. 1, 305–329 (1958)].

Each of the esters is characterized by the second of the two acyl residues esterifying the glycol component, the first one being in all three cases the residue of acetic acid, as shown in the following table:

|  |  | Organic acids whose radicals are present in the molecule | |
|---|---|---|---|
| Visnagan | Visnadin | $CH_3COOH$ | $CH_3CH_2\text{-}CH\text{-}COOH$ <br> $\quad\quad\quad\quad\quad \vert$ <br> $\quad\quad\quad\quad\quad CH_3$ |
|  | Samidin | $CH_3COOH$ | $CH_3$ <br> $\quad\setminus$ <br> $\quad\quad C=CHCOOH$ <br> $\quad/$ <br> $CH_3$ |
|  | Dihydrosamidin | $CH_3COOH$ | $CH_3$ <br> $\quad\setminus$ <br> $\quad\quad CH\text{-}CH_2COOH$ <br> $\quad/$ <br> $CH_3$ |

Of the three above-described compounds, visnadin is the principal one, not only because it constitutes the major component of the mixture, but also because it is therapeutically more active. The pharmacological activities of visnadin, samidin and dihydrosamidin are, however, very similar.

The melting points and the U.V. and I.R. spectra of these three compounds are shown as follows:

| | M.P., ° F. |
|---|---|
| Visnadin | 84–86 |
| Samidin | 134–135 |
| Dihydrosamidin | 110–112 |

In the accompanying drawings,

FIG. 1 shows the visnadin and dihydrosamidin ultraviolet spectrum in ethanol;

FIG. 2 the samidin ultra-violet spectrum in ethanol;

FIG. 3 shows I.R. spectra of visnadin, samidin and dihydrosamidin (potassium bromide pellet, Perkin-Elmer 21); and FIG. 4 is a flow sheet illustrating the process according to the inventor, which process is hereinafter explained.

In the drawing, Mode I shows the process as effected with "whole plant" or "stem and umbels" as starting materials, whereas Mode II shows the embodiment wherein "seeds" are the starting material.

Visnagan is valuable in view of its pharmacological and therapeutical properties, in particular in the treatment of angina pectoris.

In pharmacological studies visnagan has shown a remarkable coronary dilating effect. Indeed, it proved to be 6 to 8 times more active than khellin which, in its turn, is 4 to 5 times more active than aminophylline [Peres Gomes, F.-Compt. rend. Soc. Biol., 149, 1831 (1955), and J. Soc. Ciências Médicas, 120 (1956)].

The antispasmodic effect on various organs with smooth muscles of visnagan is very superior to that of papaverine and khellin. [Peres Gomes, F.-Arch. port. sc. biol., 11, 24 (1953), Compt. rend. Soc. Biol., 147, 1836 (1953), ibid. 149, 1831 (1955)].

In clinical experiments visnagan has been used for the treatment of chronic coronary insufficiency. The results obtained permitted to attribute to visnagan a remarkable efficiency, superior to the coronary dilators of general use and with the advantage of being tolerated better by the organism [(Bettencourt and col. J. Médico, 27, 763–771 (1955), and Presse Medicale, 64, 1468(1956), Bettencourt and Prista Monteiro, Med. Contemporânea, 73, 521–532 (1955), and Bettencourt, L'Hôpital, No. 690, January (1959)].

The studies of toxicology and the clinical experiments showed the harmlessness and excellent tolerance of the medicament.

Thus no secondary effects were observed which could be attributed to the medicament even when administered in therapeutical doses during months and even years [Peres Gomes, J. Soc. Ciências Médicas, 120 (1956)].

As Smith, Hosansky and Bywater showed (Abstr. of Paper, 126th Meeting American Chemical Soc., New York, Sept. 12–17 (1954), a crude visnagan described by Sammaan [Quart. J. Pharm. Pharmacol 14 (1931)], is obtained by conventional methods developed by the latter and comprising, as a first step, the preparation of an etheral extract from the plant starting material, which consists of three analog substances which differ only in one of the acids that esterify the coumaringlycol, and one of which compounds, namely visadin, is the principal one.

However, the methods known in the art are not economic enough to be applied on an industrial scale, because only after several chromatographic purifications in silica gel the product attains a convenient purity for the crystallization step. This difficulty derives from the fact that, together with visnagan, several glycerides with solubilities close to that of visnagan, mainly those of petroselinic, palmitic, oleic and linoleic acids are present in the plant material. Moreover, the conventional methods of extraction of coumarins—opening the pyrone ring by action of alkali, to obtain the alkali salts of the carboxylic coumarinic acids and effecting the separation from other compounds soluble in organic solvents, followed by regeneration of the coumarin in an acid medium and by a further extraction with an organic solvent—fail in this particular case owing to the sensitivity of the other two ester groups present in the molecule.

The existence of compounds with a very similar structure to that of the principal components of visnagan, namely visnadin, such as samidin and dihydrosamidin, increases the difficulty of purification.

It is, therefore, a further object of my invention to provide for a process for the extraction of a visnagan rich in visnadin from bishop's-weed which avoids the above-stated drawbacks, involves a simple sequence of steps and affords industrially very satisfactory yields in the order of 1% by weight based on the initial weight of extracted bishop's-weed material, and higher.

The above-mentioned objects and others which will become apparent from the description of my invention given hereinafter are attained by the process according to my invention, which comprises in combination, as the essential steps:

(I) Extraction of the conveniently comminuted plant starting material, consisting preferably of umbels and stems of bishop's-weed, with a saturated aliphatic hydrocarbon having from 5 to 12 carbon atoms per molecule.

In the extraction step (I) according to the above-outlined process of the invention, the saturated aliphatic hydrocarbons are used preferably in the form of a mixture, particularly in the form of commercially available hexane solvent. The extraction is carried out at a temperature ranging from room temperature (about 20° C.) to temperatures in the order of 100° C., under atmospheric pressure; the extraction time depends on the temperature of extraction, degree of mixing and on the degree of its comminution. It may range accordingly, for instance, from 4 to 24 hours.

The process according to the invention is based on my discovery that hexane or the like hydrocarbon forms with the soluble glycerides of the plant a mixed solvent which in turn extracts visnagan more selectively than the previously used solvents; for this reason, I also use in the leaching step (I) solutions of the oil of the plant in hexane or the like hydrocarbon. I have found that the solubility of visnagan in commercial hexane is only 0.002 g./ml. whilst in the oil of the plant it is 0.02 g./ml., i.e. ten times higher; the solubility of visnagan in a 15% solution of bishop's-weed seed oil in commercial hexane is approximately 0.0067 g./ml.

(II) Counter-current or fractional counter-current extracion of the micella resulting from (I) with aqeuous methanol.

(III) Extraction of the resulting methanolic extract with a substantially water-immiscible and methanol-immiscible organic solvent, in particular, liquid highly and preferably completely halogenated saturated hydrocarbons, whereupon a phase of this solvent rich in visnagan is obtained which visnagan-rich phase is then decolorized, concentrated and cooled, whereby visnagan crystallizes therefrom in the above-mentioned high yields.

I thus use specific systems of solvents to achieve the separation of the oil—which has played a beneficial role in the leaching step (I) as described above—from other compounds, in particular furanechromones and coumarins that are extracted together with visnagan and the subsequent separation of the furanechromones and courmarins from visnagan. Thus, with the first system, namely, aqueous 90% methanol solution/hexane, the glycerides are separated and with the second system, namely, aqueous 60%-methanol solution/carbon tetrachloride, the furanechromones and some coumarins are in their turn separated, and a fairly pure extract of visnagan is obtained. (All parts and percentages are by weight unless stated otherwise.)

In the process according to the invention, the whole plants of bishop's-weed or parts thereof are comminuted in a convenient, conventional manner with the conventionally used equipment for this operation. The plants or parts of plants may also be subjected to other conditioning treatment besides comminution. Thus, they may be dried or cooked.

The seeds of bishop's-weed can also be used as starting material in the process according to my invention. In this case, however, due to the fact that the seeds have a much higher content of khellin than the umbels and stems, the first step of this process is carried out in a different mode of operation. In this case the extraction step with saturated aliphatic hydrocarbon is preceded by a preliminary extraction (I–A) of the seeds with a water-miscible or partially water-miscible polar solvent which is preferably only limitedly, i.e. partially miscible with the saturated aliphatic hydrocarbon or hydrocarbon mixture used in the above-described extraction step (I). Liquid saturated aliphatic oxyhydrocarbons which are alcohols or ketones, and sometimes ethers, are used. Such polar solvents fulfilling these conditions, the number of which is quite limited, are especially, methanol and ethanol; another suitable polar solvent is acetone. In particular, ethanol is a good solvent for visnagan, but at the same time, it is a much better solvent for khellin, than commercial hexane. With this latter solvent, the leaching yield in khellin is rather low. The economy of the process is therefore considerably improved by using ethanol as the first extracting agent in the case of bishop's-weed seeds having the starting material. Furthermore, the oil content of seeds is also much higher than the oil content of umbels and stems and so, if commercial hexane is used, the extract has a big quantity of oil with a correspondingly low percentage of visnagan and this complicates slightly the following steps. The polar solvent is used with a water content of up to 30% by weight, and preferably undiluted. The time of treatment ranges from 6 to 60 hours.

According to this mode of operation, the seeds of the plants are first extracted with the aforesaid polar solvent at a temperature ranging from room temperature to about 100° C., and preferably at 45° C., and the resulting extract is concentrated, diluted with water, if necessary, to avoid excessive tackiness, and the resulting homogeneous or heterogeneous liquid, i.e. in the form of a solution or a suspension, is extracted with the aliphatic hydrocarbon mixture, preferably commercial hexane, according to step (I) described hereinbefore. The ratio of polar organic solvent to aliphatic hydrocarbon in this extraction ranges from about 3:1 to 1:3 (parts by volume).

The aqueous alcoholic phase obtained by separation from the hydrocarbon phase in a conventional manner, for instance by centrifuging, is further treated with chloroform and processed by known methods, whereby khellin, visnagin, khellolglucoside and some visnagan can be obtained therefrom.

The aliphatic hydrocarbon extract (I–E) which is obtained by either of the two modes of operation described hereinbefore, i.e. either by direct leaching of the umbels and stems of the plant, or by the extraction from the aqueous alcoholic leach (IA–E) of the seeds, contains visnagan together with smaller quantities of other active compounds. In order to obtain visnagan in pure form from this extract the hydrocarbon phase is extracted according to stage (II) as outlined above, countercurrently with aqueous methanol the concentration of which ranges from about 50% to about 90% by weight, but is preferably at or near the higher concentration. The hydrocarbon phase (I–E) may be previously concentrated by evaporation down to a convenient volume which is determined by the initial conditions; if all the solvent is distilled off, which is done advantageously under a reduced pressure of from 400 to 50 mm. Hg the obtained concentrate can also be partitioned by countercurrent extraction, using as the pair of solvents for this operation aqueous methanol, the concentration of which ranges from about 50% to about 90% by weight and commercial hexane or the like aliphatic hydrocarbon solvent with 5 to 12 carbon atoms. In this case, a technique of countercurrent multistage fractional extraction is advantageously employed.

In this type of extraction, the ratio of aqueous 90%-methanol to hydrocarbon solvent at room temperature is held between 1:6 and 2:1 and is preferably about 1:3 (parts by volume).

This extraction is carried out under normal pressure and at a temperature ranging from about room temperature to 30° C., and preferably at temperatures from 15 to 25° C.

A methanolic solution (II–E) rich in visnagan and khellin is obtained in the above-described countercurrent extraction, and is diluted with water, if desired, and the diluted solution (II–E) is extracted again, countercurrentwise, according to step (III) of the above-outlined process according to my invention, using as the water- and methanol-immiscible solvent, liquid highly and preferably completely halogenated saturated aliphatic hydrocarbons, for instance, trichlorethylene and carbon tetrachloride, lower aliphatic ethers such as isopropyl ether or mixtures of liquid aromatic and liquid saturated aliphatic hydrocarbons such as benzene-hexane mixtures.

In an improved mode of carrying out this stage of the process of the invention, bishop's-weed oil is recovered from hydrocarbon phase (II–H) by distillation and/or from the centrifugate separated from methanolic solution (II–E), and this oily phase (IV) is advantageously returned to the leaching step (I), thereby increasing the yield of the latter, as has been explained above.

In certain cases, if the amount of inert substances in the methanolic phase (II–E) is relatively high, exceeding, e.g. 40% of the total non-volatile content of the methanolic extract, a technique of countercurrent multistage fractional extraction is preferred, advantageously in batchwise operation.

I have found that carbon tetrachloride gives highly satisfactory results when used as the water- and methanol-immiscible solvent, but other such solvents liquid at room temperature, such as halogenated and in particular chlorinated aliphatic hydrocarbons, dialkylethers in which each alkyl group has from 1 to 3 carbon atoms, and benzene-hexane mixtures, preferably in a ratio of benzene to hexane of 1:1 parts by weight, also yield satisfactory results.

This stage (III) of the process according to the invention is carried out under normal pressure at a temperature range of from about 5° to 30° C., and preferably at 15° to 20° C. At room temperature, the ratio of the solvents used in step (III) such as carbon tetrachloride to 60% methanol may be varied between 1:1 and 1:5 (parts by volume). Optimal results are obtained in step (III) of the process according to the invention, if the substantially water- and methanol-immiscible solvent is a completely halogenated saturated aliphatic hydrocarbon such as carbon tetrachloride.

The countercurrent extractions described above may be carried out on large scale, using the equipment well known in the chemical industry, such as mixer-settlers, columns, centrifuges and so on, of which there are several convenient designs; of course, those extractions may be performed continuously or batchwise.

From stage (III) of the process of my invention, separation, for instance by centrifuging or decantation, yields an aqueous methanolic phase (III–M) rich in khellin, from which this substance can be separated in pure form by any known method. The phase (III–E) of carbon tetrachloride or the like solvent, rich in visnagan, is, if desired, decolorized with activated carbon, preferably by multiple contact, or by passing the liquid through a chromatographic column of convenient height, which can be charged with the carbon or with silica gel. The resulting colorless or near colorless liquid is then concentrated by evaporation, preferably under reduced pressure at 500 to 200 millimeter Hg, and the residue obtained is then recrystallized from suitable solvents such as diethyl ether, benzene, methanol, or ethanol, with subsequent addition of hexane or other light fractions of petroleum; the recrystallization can also be carried out using a single solvent such as carbon tetrachloride or methanol.

The mother liquors of these crystallizations, which are poor in visnagan, can be conveniently processed by evaporation of the solvent and partition of the residue by fractional multistage countercurrent extraction, advantageously batchwise, using as the pair of solvents aqueous methanol and carbon tetrachloride.

The following table shows typical values for the visnagan yield rate throughout the different steps of the above-described process:

| | Percent of visnagan in solvent-free material | | |
| --- | --- | --- | --- |
| | Seeds | | Umbels and stems |
| | (I) Leaching with hexane | (IA) Leaching with ethanol | |
| Unleached Plant material | 0.29 | 0.29 | 0.39 |
| (I) Hexane extract | 1.35 | 5.60 | 35.00 |
| (II) Methanolic extract | 30.00–40.00 | 35.00–40.00 | 65.00 |
| (III) CCl$_4$ extract | 80.00–85.00 | 75.00–80.00 | 85.00–90.00 |

Moreover, the process according to the invention is illustrated by the flow sheet shown in FIG. 4 of the accompanying drawings in which the numerals (I), (IA), (II) and (III) refer to the process stages described hereinabove.

The invention is further illustrated by the following examples without being limited thereto. All stages are carried out at room temperature (about 20° C.) and under atmospheric pressure unless otherwise stated. All parts and percentages are by weight unless stated otherwise.

*Example 1*

250 kg. of umbels and stems of *Ammi visnaga* L. (Lam.), crushed conveniently to a weight average size of about 0.8–0.85 mm., were leached in a batch extractor with 750 liters of commercial hexane, at 20° C., under normal atmospheric pressure. After 24 hours of contact time, 525 liters of miscella were collected and the plant material was then washed three times with 250 liters of commercial hexane, each time; about 700 liters of washing solution were obtained for recycling to the next batch. The solids were desolventized into the extractor at a pressure of about 1.5 kg./cm.$^2$. The vapor forms two layers on condensing and these layers are collected separately by means of a continuous decanter. The commercial hexane is thus almost completely recovered.

The 525 liters of the clarified miscella obtained were extracted with 90%–aqueous methanol solution, in a battery of 3 mixer-settlers, by multistage countercurrent extraction equivalent to 5 theoretical stages; the hexane:methanol solvent ratio was 3:1. The methanolic extract with a volume of about 175 liters, was diluted with distilled water down to a concentration in methanol of 60% and then centrifuged to separate a small quantity of oil in hexane (about 10–15 liters), and about 240 liters of diluted methanolic extract. This liquid was then extracted with carbon tetrachloride by countercurrent extraction in a battery of two mixer-settlers using a methanol:CCl$_4$ solvent ratio of 3:1. About 100 liters of carbon tetrachloride extract were obtained which were afterwards decolorized with activated carbon by multiple contact in three stages, and concentrated by evaporation at atmospheric pressure, down to 5% of its initial volume. The concentrate was cooled to promote crystallization; 960 g. of wet crystals were thus collected. By further concentration of the mother liquors and subsequent cooling another crop of crystals was obtained weighing 240 g., which recrystallized from the same solvent produced 105 g. of pure product; processing the combined mother liquors in the same manner, another 162 g. of visnagan were collected. A total amount of 775 g. of pure visnagan was thus obtained, melting point 80–86° C. (yield 3.1%, calculated on the weight of the raw material).

*Example 2*

250 g. of seeds of "*Ammi visnaga* L. (Lam.)," conveniently ground to a weight average size of about 0.45–0.50 mm., were leached in a batch extractor during 48 hours with 600 liters of ethanol at 20° C. and under normal atmospheric pressure. After collecting part of the miscella, the solids were washed twice with ethanol, using each time 250 liters of solvent; about 600–700 liters of miscella and about 400–500 liters of low content ethanolic solution were thus obtained, the latter being recycled to the next batch.

The ethanol adhering to the seeds is recovered by desolventizing the solids with live steam at a pressure of about 1.5 kg./cm.², condensing the vapors and stripping the condensed alcoholic solution by distillation; an appreciable fraction of this solvent is thus recovered.

The 600–700 liters of miscella were concentrated by evaporation down to 20% of the initial volume and the concentrate diluted with equal volume of distilled water. The resulting solution was extracted with commercial hexane by multiple contact extraction in a battery of 3 mixer-settlers and using an ethanol:hexane solvent ratio of 2:1. The aqueous phase is rich in khellin and is processed separately to obtain this product; the combined organic phases, with a volume of about 120 liters, were extracted in a battery of 3 mixer-settlers by multistage countercurrent extraction equivalent to 5 theoretical stages with 90% aqueous methanol, using an hexane:methanol solvent ratio of 3:1. The methanolic extract (about 50 liters) was diluted with distilled water down to a concentration of 60% in methanol and centrifuged to separate a layer of about 7–8 liters of oil and hexane and about 60 liters of diluted methanolic extract. The latter was extracted with carbon tetrachloride by countercurrent extraction in a battery of two mixer-settlers using a methanol:CCl₄ solvent ratio of 3:1. About 40 liters of carbon tetrachloride extract were obtained, which were then concentrated by evaporation at atmospheric pressure down to about 5% of the initial volume. The resulting concentrate was divided into two equal parts. One of them was cooled to promote crystallization, giving 300 g. of crude crystals. These crystals were dissolved in benzene and purified by chromatography (with benzene-ethyl ether or ethyl acetate) through a column of silica gel, the eluate being evaporated to dryness at reduced pressure (20 mm. Hg). The residue was redissolved in ethyl ether and recrystallized from ethyl ether-petroleum ether (1:2; 150 g. of visnagan having a melting point of 80–84° C. were thus obtained.

From the other half of the concentrate the carbon tetrachloride was distilled off, using benzene as entraining agent, and the residue was dissolved in ethyl ether. This solution was purified by chromatography in a column of silica gel, and the eluate collected was evaporated to dryness at reduced pressure (20 mm. Hg). The residue was dissolved again in ethyl ether and recrystallized from ether-petroleum ether (1:2), giving 170 g. of crystalline product.

A total of 320 g. of pure visnagan having a melting point of 80°–85° C. were thus obtained (yield 1.26% referred to the weight of the raw material).

*Example 3*

300 kg. of seeds of "*Ammi visnaga* L. (Lam.)," conveniently ground to a weight average size of about 0.45–0.50 mm. were leached, in a batch extractor with 400 liters of commercial hexane, at 20° C. under 760 mm. pressure, and the solids were afterwards washed twice with 400 liters each time of hexane; about 650 liters of miscella and about 400 liters of poor extract were collected, the latter being recycled to the next batch. The seeds were desolventized by injecting live steam at a pressure of about 1.5 kg./cm.², condensing the resulting vapors and separating the two phases in a continuous decanter; most of the hexane is thus recovered. The 650 liters of miscella were extracted with 90% aqueous methanol, by multistage countercurrent extraction equivalent to 5 theoretical stages, in a battery of 3 mixer-settlers, using a solvent ratio of 3:1. The methanolic extract, with a volume of about 215 liters, was diluted with distilled water down to a concentration of 60% in methanol and centrifuged to separate a layer of about 12–17 liters of oil and hexane, and about 310 liters of diluted methanolic extract. This solution was extracted countercurrentwise with carbon tetrachloride in a battery of two mixer-settlers, using a methanol:CCl₄ solvent ratio of 3:1. About 130 liters of carbon tetrachloride were obtained and then concentrated by evaporation at atmospheric pressure down to 5% of the initial volume. This concentrated liquid was cooled and processed as described in any of the previous examples, to give pure visnagan crystals.

I claim:

1. Process for production of visnagan rich in visnadin comprising
   (1) extracting comminuted umbels and stems of *Ammi visnaga* L. (Lam.)-plant with saturated aliphatic hydrocarbon of 5 to 12 carbons at a temperature between ambient and normal boiling point of said hydrocarbon, whereby miscella extract is obtained,
   (2) extracting the resultant miscella with aqueous methanol containing about 50 to 90% by weight methanol, the ratio of hydrocarbon to aqueous methanol in said extraction being from 6:1 to 1:2 parts by volume, whereby a methanolic extract is obtained,
   (3) diluting said methanolic extract with water to render said extract about 60% by weight methanol,
   (4) extracting the resultant diluted methanolic extract, with halogenated lower hydrocarbon at a temperature of from 5° to 30° C., the ratio of methanolic extract to halogenated hydrocarbon being from 5:1 to 1:1 parts by volume, whereby a halogenated hydrocarbon extract rich in visnagan is obtained, and
   (5) concentrating by evaporation the halogenated hydrocarbon extract and cooling the concentrated extract until the visnagan rich in visnadin separates in crystal form.

2. Process of claim 1, wherein the extraction of step (1) is effected at a temperature between 5 and 30° C.

3. Process of claim 1, wherein the halogenated lower hydrocarbon is a member selected from the group consisting of trichloroethylene, carbon tetrachloride, and chloroform.

4. Process of claim 1, wherein miscella in step (2) is concentrated by evaporation before being extracted with the aqueous methanol solution.

5. Process for production of visnagan rich in visnadin comprising
   (1) extracting comminuted whole *Ammi visnaga* L. (Lam.)-plant with saturated aliphatic hydrocarbon of 5 to 12 carbons at a temperature between ambient and the normal boiling point of said hydrocarbon, whereby miscella extract is obtained,
   (2) extracting the resultant miscella with aqueous methanol containing about 50 to 90% by weight methanol, the ratio of hydrocarbon to aqueous methanol in said extraction being from 6:1 to 1:2 parts by volume, whereby methanolic extract is obtained,
   (3) diluting said methanolic extract with water, to render said extract about 60% by weight methanol,
   (4) extracting the resultant diluted methanolic extract with a member selected from the group consisting of trichloroethylene, carbon tetrachloride, and chloroform at a temperature of from 5 to 30° C., the ratio of methanolic extract to halogenated hydrocarbon being from 5:1 to 1:1 parts by volume, whereby said chlorinated hydrocarbon extract rich in visnagan is obtained,
   (5) concentrating said chlorinated hydrocarbon extract by evaporation,
   (6) cooling the resultant concentrate from step (5) to crystallize visnagan rich in visnadin thereby obtaining a crude crystallization product, and
   (7) recrystallizing said crude product in said chlorinated hydrocarbon to obtain substantially pure product.

6. Process for production of visnagan rich in visnadin comprising
   (1) extracting comminuted seeds of *Ammi visnaga* L. (Lam.)-plant with a polar solvent selected from the group consisting of methanol, ethanol and isopropanol, whereby miscella extract is obtained,
   (2) concentrating said miscella extract by evaporation to about 20% its initial volume followed by dilution with an equal part by volume of water,
   (3) extracting the resultant diluted miscella with saturated aliphatic hydrocarbon of 5 to 12 carbons at a temperature between ambient and the normal boiling point of said hydrocarbon, the ratio of said polar solvent to hydrocarbon being from 3:1 to 1:3, whereby miscella hydrocarbon extract is obtained,
   (4) extracting the resultant miscella with aqueous methanol containing about 50 to 90% by weight methanol, the ratio of hydrocarbon to aqueous methanol in said extraction being from 6:1 to 1:2 parts by volume, whereby a methanolic extract is obtained,
   (5) diluting said methanolic extract with water to render said extract about 60% by weight methanol,
   (6) extracting the resultant diluted methanolic extract, with halogenated lower hydrocarbon at a temperature of from 5° to 30° C., the ratio of methanolic extract to halogenated hydrocarbon being from 5:1 to 1:1 parts by volume, whereby a halogenated hydrocarbon extract rich in visnagan is obtained, and
   (7) concentrating by evaporating the halogenated hydrocarbon extract and cooling the concentrated extract until the visnagan rich in visnadin separates in crystal form.

7. Process of claim 1 wherein said saturated aliphatic hydrocarbon is commercial hexane.

8. Process of claim 5 wherein said saturated aliphatic hydrocarbon is commercial hexane.

9. Process of claim 6 wherein said saturated aliphatic hydrocarbon is commercial hexane.

References Cited in the file of this patent

UNITED STATES PATENTS

| | | |
|---|---|---|
| 2,980,699 | Smith et al. | Apr. 18, 1961 |
| 2,995,574 | Le Men | Aug. 8, 1961 |

OTHER REFERENCES

Cavallito et al.: J. Org. Chem., vol. 15 (1950), pages 820–823.